US008140308B2

(12) United States Patent
Menuey

(10) Patent No.: US 8,140,308 B2
(45) Date of Patent: Mar. 20, 2012

(54) METHOD OF SELECTING AN ARRANGEMENT OF SECTORS FOR A TURBOMACHINE NOZZLE

(75) Inventor: Justine Menuey, Chatellerault (FR)

(73) Assignee: SNECMA Services, Paris (FR)

( * ) Notice: Subject to any disclaimer, the term of this patent is extended or adjusted under 35 U.S.C. 154(b) by 598 days.

(21) Appl. No.: 12/341,120

(22) Filed: Dec. 22, 2008

(65) Prior Publication Data

US 2009/0164037 A1 Jun. 25, 2009

(30) Foreign Application Priority Data

Dec. 24, 2007 (FR) ..................................... 07 60335

(51) Int. Cl.
*G06F 9/455* (2006.01)

(52) U.S. Cl. .......................................................... 703/7

(58) Field of Classification Search .................. 703/6, 7; 415/209.3, 191, 115, 193; 702/45; 60/204, 60/776, 740, 760; 239/533.1, 265.37; 416/97 R
See application file for complete search history.

(56) References Cited

U.S. PATENT DOCUMENTS

| | | | | |
|---|---|---|---|---|
| 6,393,331 | B1 | 5/2002 | Chetta et al. | |
| 2004/0020210 | A1* | 2/2004 | Tanaka et al. | 60/740 |
| 2004/0120814 | A1* | 6/2004 | Brainch et al. | 415/209.3 |
| 2004/0170499 | A1* | 9/2004 | Powis et al. | 416/97 R |
| 2005/0116061 | A1* | 6/2005 | Carper | 239/265.37 |
| 2005/0167531 | A1* | 8/2005 | Soupizon et al. | 239/533.1 |
| 2006/0147299 | A1* | 7/2006 | Iacopetti | 415/115 |
| 2007/0122275 | A1* | 5/2007 | Busch et al. | 415/209.3 |
| 2007/0297900 | A1* | 12/2007 | Abgrall et al. | 415/209.3 |
| 2008/0038110 | A1* | 2/2008 | Roberts et al. | 415/191 |
| 2008/0083229 | A1* | 4/2008 | Haynes et al. | 60/776 |
| 2008/0127628 | A1* | 6/2008 | Ponziani | 60/204 |
| 2008/0133149 | A1* | 6/2008 | Ponziani et al. | 702/45 |

FOREIGN PATENT DOCUMENTS

| | | |
|---|---|---|
| EP | 0 716 219 A1 | 6/1996 |
| EP | 1 113 373 A2 | 7/2001 |
| EP | 1 731 713 A2 | 12/2006 |

OTHER PUBLICATIONS

Klein, A., "Characteristics of combustor diffusers", Proceedings of Aerospace Science, 1995.*

* cited by examiner

*Primary Examiner* — Kandasamy Thangavelu
(74) *Attorney, Agent, or Firm* — Oblon, Spivak, McClelland, Maier & Neustadt, L.L.P.

(57) ABSTRACT

A method of selecting an arrangement of sectors for a turbomachine nozzle is disclosed. The method includes: A) creating a database of three-dimensional numerical models of the sectors by digitizing; B) setting a criterion for selecting an arrangement of sectors and setting a desired value for said criterion, the criterion being a function of the shapes and the relative positions of the sectors; C) for the various arrangements that are evaluated, determining the relative positions of the sectors when assembled together by performing a virtual assembly, and as a function of said positions, determining the value of the selection criterion for the arrangement under evaluation; and D) retaining the arrangement for which the selection criterion has the value closest to the desired value.

15 Claims, 2 Drawing Sheets

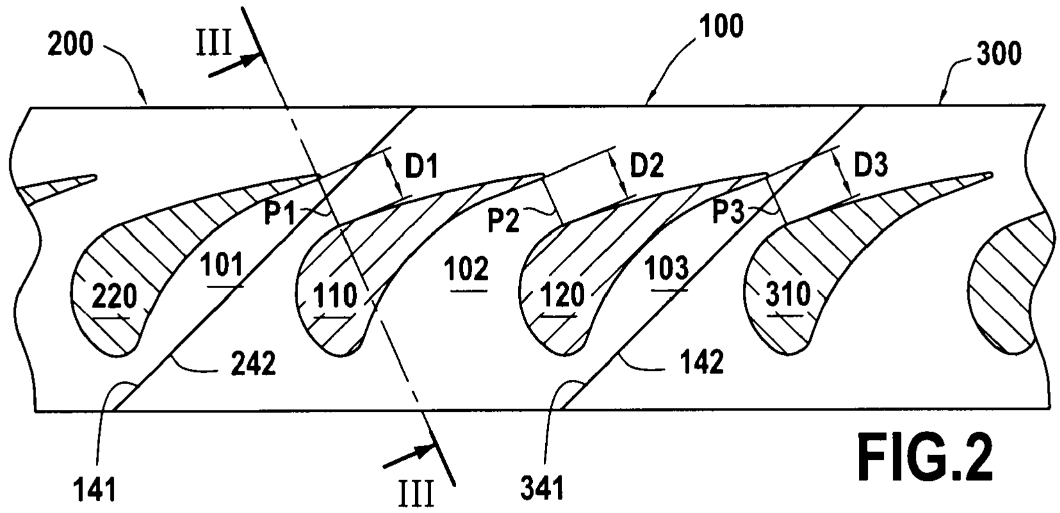
FIG.2
FIG.3
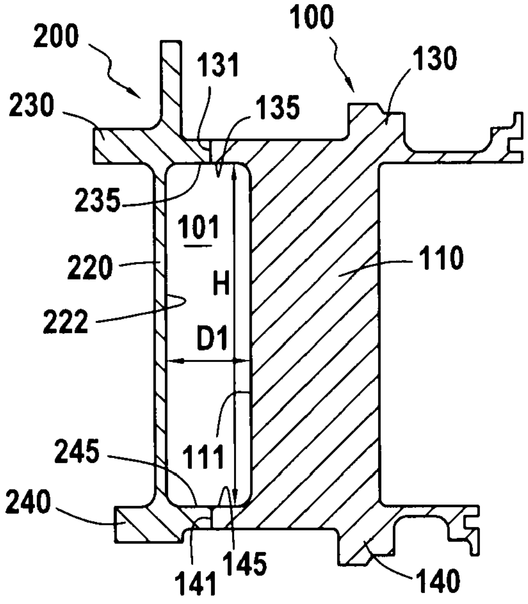
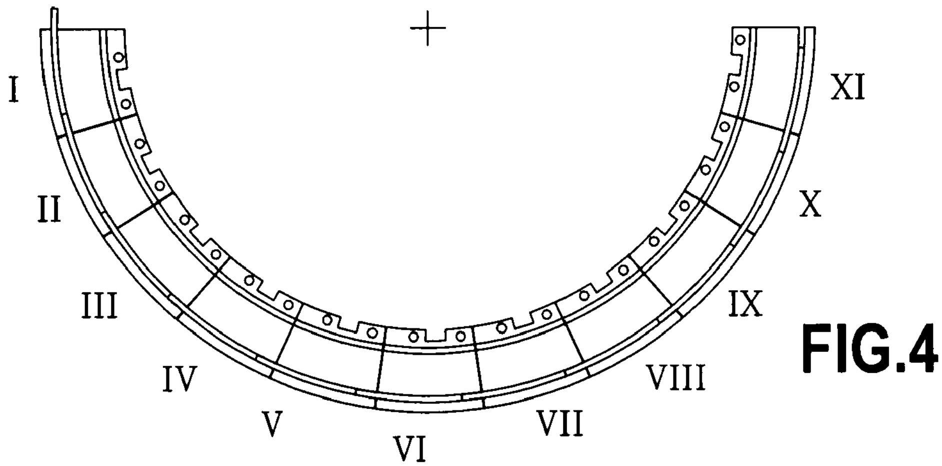
FIG.4

METHOD OF SELECTING AN ARRANGEMENT OF SECTORS FOR A TURBOMACHINE NOZZLE

FIELD OF THE INVENTION

The present invention relates to a method of selecting an arrangement of sectors for a turbomachine nozzle.

BACKGROUND OF THE INVENTION

In a turbomachine nozzle, a sector is a known part that comprises one or more vanes interconnecting two platforms. The nozzle is essentially constituted by uniting sectors to make up a ring. In the nozzle, each sector is positioned in or takes up an assembly position relative to the two sectors situated on either side thereof by means of contact surfaces of its platforms coming into abutment with contact surfaces of the platforms of the adjacent sectors.

In a nozzle, all of the sectors nearly always have the same shape. The differences between sectors are difficult to measure and are often not perceivable by the naked eye. A fortiori, in general the quality of the relative positioning between adjacent sectors is not evaluated. That is why it is not general practice to optimize the arrangement of sectors within a nozzle.

Nevertheless, it is found that as a result of variations in the conditions of fabrication and use of the sectors, there can exist non-negligible differences of shape between them. These differences can lead to the appearance of geometrical defects such as asymmetries, and that is very harmful for the lifetime of the nozzle or even of the turbomachine in which it is mounted, because of the vibration that such asymmetries can cause. Another harmful consequence is a decreasing the efficiency of the nozzle, or at least obtaining efficiency that is sub-optimal.

OBJECT AND SUMMARY OF THE INVENTION

The object of the present invention is to define a method of selecting an arrangement of sectors for a turbomachine nozzle that makes it possible, from amongst a plurality of evaluated arrangements of sectors, to select the arrangement that is optimal in terms of the efficiency or the operation of the sectors once assembled. Naturally, the method seeks more particularly to make it possible to select an arrangement for a set of sectors making up a complete nozzle.

This object is achieved by the fact that the method comprises the following steps:

A) creating a database of three-dimensional numerical models of the sectors by digitizing;

B) setting a criterion for selecting an arrangement of sectors and setting a desired value for said criterion, the criterion being a function of the shapes and the relative positions of the sectors;

C) for the various arrangements that are evaluated, determining the relative positions of the sectors when assembled together by performing a virtual assembly, and as a function of said positions, determining the value of the selection criterion for the arrangement under evaluation; and D) retaining the arrangement for which the selection criterion has the value closest to the desired value.

Above, the term "arrangement" for the sectors of a turbomachine nozzle specifies the ordered sequence of the individual references of said sectors when assembled together to form a nozzle, i.e. in their relative positions when assembled in a ring. Thus, two arrangements differ when the positions of the sectors within the nozzle are not the same, for example if the sectors have been permutated. It should be observed that an arrangement of sectors can also designate an ordered sequence of individual references in a set of sectors that do not constitute an entire nozzle, but only a portion thereof.

The database constituted in step A) contains a plurality of sector models, i.e. a collection of sector models, these models being approximately identical because they all represent sectors that are for making up a given nozzle, but that nevertheless present secondary differences because they are obtained by digitizing the various different sectors. It is the existence of these differences that makes it advantageous to select one arrangement rather than another.

Furthermore, selecting an arrangement for a set of sectors bears not only on selecting which sectors are to be make up the arrangement, but also on the respective positions of those sectors within the arrangement.

The above-described method of selecting an arrangement of sectors enables the selection of sectors and of their relative positions within a nozzle to be optimized when making up the nozzle. As a result, a nozzle is obtained that presents improved performance, and increased lifetime. Furthermore, the use of a database of three-dimensional numerical models of the nozzle sectors makes it possible to monitor and track over time a large number of geometrical characteristics of the sectors of a nozzle.

The term "digitizing" is used herein to designate any method of taking three-dimensional coordinates from a part, whether by mechanical means with the help of a feeler tip, or by optical means using a laser scanner or projecting structured light, for example. Under all circumstances, digitizing involves taking a large number of three-dimensional coordinates so as to obtain a "cloud" of points, thus making it possible to present the resulting numerical model in the form of a mesh on a computer screen.

In step A) of creating a database of three-dimensional numerical models of the sectors, each nozzle sector is generally measured when disassembled, independently of the other sectors and without them being in position relative thereto ( appropriate means can nevertheless be used for fastening or holding a sector while it is being measured).

Digitizing parts such as nozzle sectors is an operation that is difficult to perform, but it nevertheless presents substantial advantages.

This operation is difficult firstly because of the shapes of the surfaces of the nozzle sector. A nozzle sector is a part of complex shape, presenting numerous skew surfaces, with the normals thereto extending in all directions.

Although it is not necessary to digitize the outside surfaces of the sector in full, it is necessary to digitize at least two families of surfaces:

These are firstly the surfaces for which the numerical model is needed in order to determine the value of the selection criterion that is being used. Naturally, these surfaces may be located in positions that are difficult to access. The main functional surfaces of the sector that are the most important are the surfaces of the vanes; unfortunately, these surfaces are located mainly in the inter-vane channel. This channel is narrow, having a width of a few millimeters to a few centimeters; inserting a measurement tool into this space is therefore difficult. Measuring the surfaces of the inter-vane channel is therefore particularly problematic; this is why, with numerous criteria, digitizing the surfaces needed for evaluating the criterion is found to be problematic.

The second family of surfaces that need to be digitized in order to assemble sectors virtually, as is performed in step C), are the reference surfaces that are needed to perform virtual assembly. These reference surfaces are oriented in a manner quite different from that of the surfaces to be measured. This results in an additional difficulty in measurement.

Finally, the digitizing operation must present high accuracy. Acceptable measurement uncertainty cannot exceed one-hundredth or a few hundredths of a millimeter.

Because of the reasons given above, digitizing a nozzle sector is an operation that is difficult.

Conversely, digitizing provides a three-dimensional numerical model of a nozzle sector that contains a very large amount of information concerning the sector, and in practice, a potentially almost complete survey of the outside shape thereof. Such numerical models can therefore be used to perform the step of virtually assembling models and of determining the value of the criterion for the assembled set of model sectors, operations that could clearly not be performed in the absence of a database of numerical models of the nozzle sectors.

Finally, the database made up in the context of the method of the invention has numerical models that enable a large number of dimensions of the nozzle sector to be measured and that enable their real values to be verified against their design values and tolerances. The database can thus be used for powerful traceability operations.

Finally, the selection criterion that is set in step B) can take different values as a function of the constraints that are deemed to be the most important for optimizing the nozzle. By way of example, it is thus possible to seek to make the flow sections as similar to one another as possible within the nozzle, independently of their respective dimensions; any other criterion can be used as a function of the shapes and the relative positions of the various sectors in the arrangement.

Depending on the computation power available, it is possible to apply the method to evaluating a greater or smaller number of arrangements. If a large amount of computation power is available, it is possible to envisage testing all combinations of sectors in the database.

If the computation power is more modest, it is possible to proceed as follows: in step C), an evaluated arrangement is the combination of an arrangement as selected by the method plus another sector or another arrangement as selected with the help of the method. The algorithm for assembling the nozzle is thus a recursive algorithm: the arrangement of sectors making up the nozzle is built up little by little, on each occasion optimizing the addition of a new nozzle sector relative to the existing arrangement. The computation power consumed is much less than in the above example.

Furthermore, the database of three-dimensional nozzle sectors models can be used either to optimize assembling a single nozzle, or else to optimize a collection of nozzle sectors suitable for making up a plurality of nozzles.

Thus, depending on the implementation, in step A), the database used for the method may contain sectors coming from a single nozzle or else sectors coming from at least two different nozzles.

The method includes a step that is important, in particular from the point of measurement accuracy, namely that of virtually assembling the numerical models of the sectors of the arrangement under evaluation in their assembled positions. (The term "virtual assembly" is used herein to mean determining the various changes of three-dimensional frame of reference that need to be applied to each of the three-dimensional digital models of the sectors in order to place them mutually in their relative positions in an assembly in a virtual space. The sectors can be said to be being put into position relative to one another). For this virtual assembly, resetting is thus performed numerically on a computer between the numerical models of the various sectors in the arrangement being evaluated.

In virtual assembly step C), the numerical models of the sectors for a nozzle having the arrangement under evaluation are virtually assembled as follows. As described above, the nozzle sectors include contact surfaces and these surfaces are placed in their positions relative to the contact surfaces of the adjacent nozzle sectors by being put into abutment.

In an implementation, in the database created in step A), the numerical models of the sectors include modeling the contact surfaces involved putting them into their assembly relative positions; and in step C) the numerical models of the sectors are virtually assembled in the arrangement under evaluation by putting the contact surfaces of adjacent sectors in said arrangement into correspondence.

Numerical resetting thus applies the same rules and therefore gives the same results as the physical resetting that could be performed between the various nozzle sectors in the arrangement under evaluation.

It should also be observed that by resetting a set of nozzle sectors simultaneously, it becomes possible to determine all of their flow sections together (each flow section being determined relative to the two adjacent sectors in the position under study).

In an implementation, in step A), digitizing is performed using contactless optical measurement means. The use of contactless measurement means or optical measurement means is particularly advantageous for nozzle sectors since it avoids any scratching of the parts and it avoids any degradation of the surfaces thereof.

In another implementation, the numerical models of the sectors are created by digitizing automatically. This can be achieved in particular by fitting the digitizing sensor, such as 3D scanner with structured light projection, to the end of a robot arm. In order to digitize each sector, the robot arm follows a predetermined path, including a certain number of stop positions. When the arm stops in these stop positions, the digitizing sensor proceeds to acquire data. In known manner, the various acquisitions performed in the different stop positions are reset relative to one another automatically by a computer so as to constitute the three-dimensional numerical model of the digitized sector. A set of sectors can be digitized in automatic mode by also using a conveyor that brings the various sectors for digitizing in succession up to the robot arm carrying the digitizing sensor.

In an implementation, the steps for determining a set of arrangements for evaluation, of virtually assembling the sectors in an arrangement under evaluation, and/or of determining the values for the selection criterion applicable to the various arrangements under evaluation, are all performed automatically. The computer software used for performing resetting step C) and for determining flow sections can be programmed to perform such operations in sequence, without human intervention. The result obtained is an inspection report giving the optimum arrangement and the value of the selection criterion for said arrangement.

The advantages of automation are a saving in time, a reduction in operator error, a reduction in manpower time, and an increase in result reproducibility, thus ending up with better accuracy for the measurement method.

In an implementation, the selection criterion is a function of the respective flow passages of the nozzle sectors. In a nozzle, overall performance depends in particular on the flow sections of the nozzle, i.e. on the sum of the flow sections of the various sectors. Measuring these flow sections is thus an operation that is important.

For a given sector, flow sections are areas measured perpendicularly to the flow direction in the passages for the flow through the nozzle sector. By extension, the term "flow sections" could also be used to mean more simply merely the widths of the flow section through the nozzle sector, as measured in a direction perpendicular to the axes of the vanes.

Below, the term "flow sections" is considered in its proper sense, i.e. for flow sections that are areas. However, it can be understood that the present invention also applies to circumstances in which the flow sections are specified merely as flow section width, as mentioned above.

Amongst the flow sections of a nozzle sector, a distinction can be drawn between internal flow sections and external flow sections.

Internal flow sections involve only nozzle sectors having at least two vanes, and they are measured between pairs of adjacent vanes in the sector under consideration.

The external flow sections, always two in number, each represent half of the area formed between an end vane of the sector and the adjacent vane of the facing sector in the nozzle. In principle, the area between the end vane of the nozzle sector and the adjacent vane could be determined using an adjacent vane having nominal dimensions; that produces a nominal flow section for the end in question of the nozzle sector. By extension, it is possible to determine a real flow section for the end of the nozzle relative to a vane of a given sector; in such circumstances, the area is determined between the end vane of the nozzle sector and said vane of a given sector, and the flow section for said end of the nozzle sector is half said area.

In an implementation, in order to determine the flow section of a sector located at one end of the arrangement, use is also made of a theoretical numerical model for a reference vane. The term "theoretical numerical model" is used here to mean a model as generated by computer, typically with the help of computer-assisted design (CAD) software; this is in contrast to a model that is the result of digitizing.

If the arrangement of sectors does not constitute a complete nozzle, but only a portion thereof, the question arises, when the selection criterion concerns the flow sections of the sectors, of measuring the flow sections of the two sectors situated at the ends of the arrangement. The numerical models of two reference vanes are then used. During virtual assembly of the sectors, these vanes are positioned in the assembly relative positions at the ends of the arrangement. It is then possible to calculate the flow sections for the set of sectors, and thus to bring the method of selecting an arrangement to its conclusion.

BRIEF DESCRIPTION OF THE DRAWINGS

The invention can be well understood and its advantages appear better on reading the following detailed description of embodiments given as non-limiting examples. The description refers to the accompanying drawings, in which:

FIG. 2 is a circumferential section view of a measured sector and of two adjacent sectors, in their assembly relative position;

FIG. 3 is a section view of a sector showing the section of the inter-vane channel in which a flow section between two adjacent vanes is measured; and FIG. 4 is a face view of a set of nozzle sectors, in an arrangement that is optimized by the method of the invention.

Figure 1:
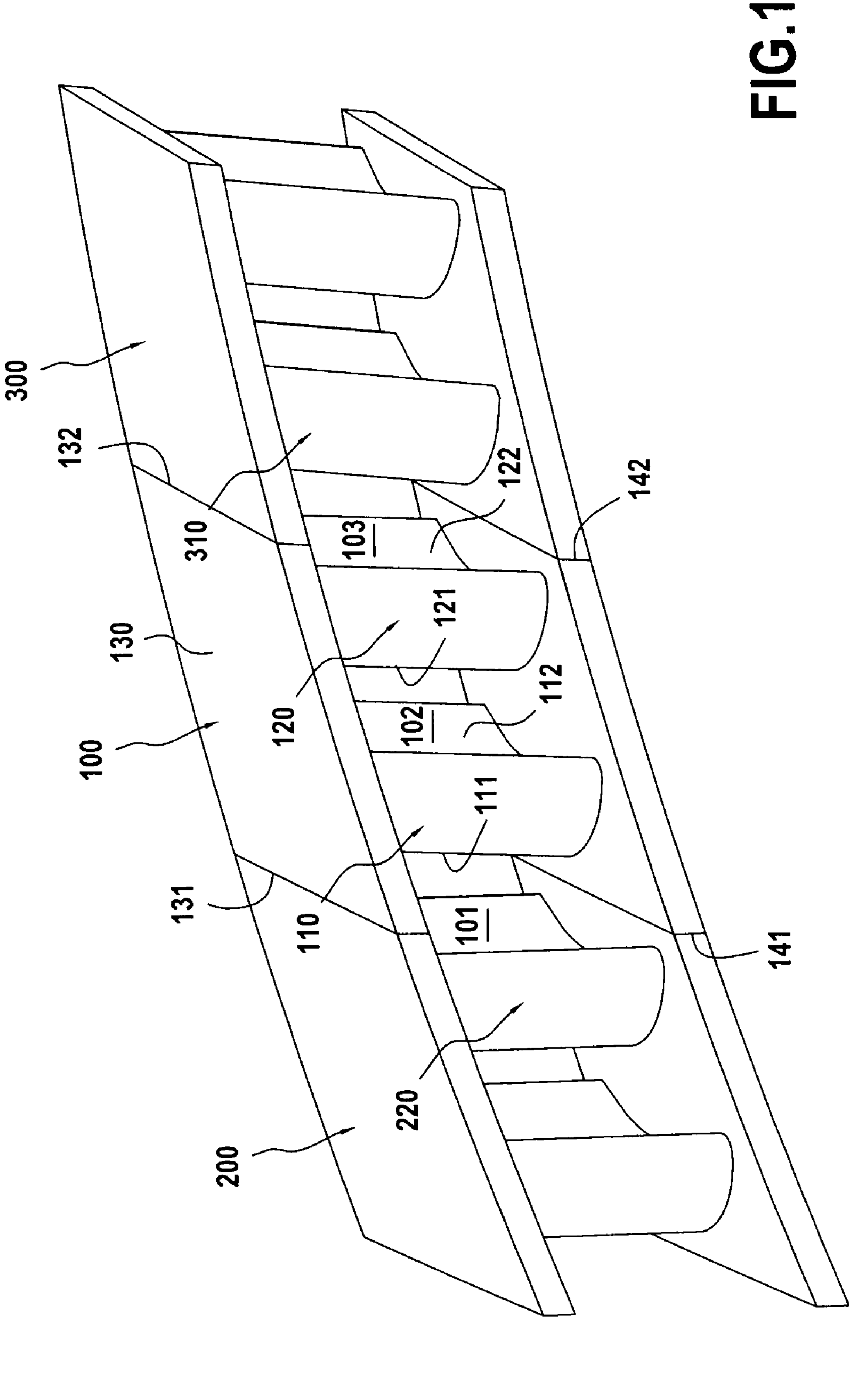
FIG. 1 is a perspective view of three nozzle sectors presented in the relative positions they occupy when assembled together (their assembly relative positions)

It should be observed that when an element appears in more than one of the figures, either identically or in analogous form, it is described with reference to the first figure in which it appears; furthermore, an element is described only once.

MORE DETAILED DESCRIPTION

A nozzle sector is described below with reference to FIGS. 1 and 2. Combining such sectors enables a nozzle to be built up, arranged around a nozzle axis.

The nozzle sector 100 in FIG. 1 comprises two substantially parallel platforms 130 and 140. These platforms are substantially cylindrical in shape about the axis of the nozzle. The platforms 130, 140 have contact surfaces 131, 132, 141, and 142 directed respectively towards the two nozzle sectors located on either side of the measured sector 100 (in the assembly relative position). The contact surfaces are designed to keep the laterally adjacent nozzle sectors 200 and 300 in their contacting relative positions. These lateral sectors 200, 300 include respective end vanes 220 and 310 that are placed facing the end vanes of the sector 100 when the sectors are in the assembly relative position.

The nozzle sector 100 also comprises two vanes 110, 120. Each of the vanes presents an airfoil with a pressure side 111, 121 and a suction side 112, 122. Since there are only two vanes in the sector 100, each of the vanes 110, 120 is an end vane. Thus each of these vanes is designed to be placed facing an end vane of an adjacent nozzle sector in the assembly relative position. More precisely, the pressure side 111 faces the suction side 222 of the vane 220, and the pressure side 122 faces the suction side 311 of the vane 310.

Respective inter-vane flow passages 101, 102, and 103 are formed between the vanes. The passage 102 is formed between the vanes 110 and 120 of the sector 100. However the inter-vane passages 101 and 103 are each formed between one of the vanes (110 or 120) of the sector, and a facing reference vane 220 or 310.

In the implementation of the method described below, the selection criterion used for determining an arrangement is a function of the flow section in each sector. For this reason, prior to describing the method of the invention in detail, the way in which the flow sections of a nozzle sector are determined is described initially.

The flow sections are shown in FIG. 2. FIG. 2 is a section in a plane P perpendicular to the axis of the vanes and substantially halfway up them, through nozzle sectors 100, 200, 300 and showing in particular the reference vanes 220 and 310 (assuming that these vanes are solid vanes).

This section view shows the sections of the various vanes 220, 110, 120, 310; the contact surfaces put into correspondence, 242, 141, 142, 341; and the inter-vane channels 101, 102, 103. By design, the nominal shape of the various channels is substantially the same.

As can be seen, in a given inter-vane channel, the distance between the vanes varies as a function of position along the channel. Normally, there exists a single plane in which this distance is at a minimum. Since the distance between the platforms 130, 140 is substantially constant, it is also in this plane that the flow section between the vanes is at a minimum, for a given inter-vane channel. This channel plane corresponds approximately to the planes P1, P2, P3 for the channels 101, 102, 103; the distances between the vanes in these sections are respectively D1, D2, and D3. It should be observed that the method of the invention makes it possible, advantageously, to optimize the position of the section planes P1, P2, P3 for each inter-vane channel, thereby making it possible to determine the plane of the inter-vane channel in which the flow section is indeed at a minimum.

FIG. 3 is a section view through the nozzle sector on plane P1. It shows the shape of the passage in the inter-vane channel 101.

On the basis of the information provided by the section of FIG. 3, the value of the flow section of the inter-vane channel 101 can be determined as follows:

Firstly a flow section between two adjacent vanes is defined as being substantially equal to the minimum area between them through which the flow passes.

Also by definition, the flow sections of the sector (when the sector has more than one vane) comprise firstly the flow section(s) between the adjacent pair(s) of vanes of the sector (these are referred to as internal flow sections of the sector); and secondly one-half of each of the flow sections between an end vane of the sector and the vane of the adjacent sector facing it (these are referred to as external flow sections of the sector).

In one technique for calculating the flow section, the flow section between two adjacent vanes is determined on the basis of the shortest distance between them. The shortest distances between adjacent vanes in the three inter-vane channels 101, 102, 103 shown in FIG. 2 are the distances D1, D2, and D3.

It should be observed firstly that by extension of the concept of a flow section, a flow section can be defined not by an area through which the flow passes, but by a width on the passage for the flow.

Under such circumstances, the distance D2 (for an internal flow section of the sector), and one-half of each of the distances D1 and D3 (for the external flow sections of the sector) can be considered as being the flow sections of the nozzle sector.

We return to the first definition for flow sections, where flow sections are defined as areas.

Thus, a flow section between two adjacent vanes is equal to the area of the section of the empty space between the two vanes in a plane substantially parallel to the axis of the vanes and in which the distance between the vanes is the shortest.

This section is shown in FIG. 3 for the inter-vane channel 101. FIG. 3 is a section through nozzle sectors 100 and 200 in the assembly relative position. This section is on plane P1 corresponding to the shortest distance between the adjacent vanes 220 and 110, as can be seen in FIG. 2. It should be observed that digitizing the vanes of the sectors 100 and 200 makes it possible to obtain the real section of the passage 101 and to determine the real positions of the four walls 111, 222, 135-235, 145-245, defining the sector and as shown in FIG. 3.

Given these positions, the area of the portion of the plane P1 situated between these four walls can be calculated or determined. This determination can be performed in several ways that are more or less similar.

The distance between the platforms 130-230 and 140-240 is constant to a first approximation (since these platforms are substantially cylindrical in shape and coaxial), so the value of the flow section $S_{101}$ in the inter-vane channel 101 between the two adjacent vanes 220 and 110 is the product of the shortest distance between the vanes, i.e. D1, multiplied by the distance H between the platforms.

Consequently, at the ends of the sector, the relative of the flow sector under consideration (the measured flow sector) referred to as the "external" flow section, is equal to half of this product, so it is given by:

$$S_{100/1}=\tfrac{1}{2}\times S_{101}=\tfrac{1}{2}\times D1\times H$$

for the section of the inter-vane channel 101 of FIG. 3.

For the channels 102 and 103, the flow sections relating to the sector 100 are respectively as follows:

$S_{100/2}=S_{102}=D2\times H$ (internal flow section); and $S_{100/3}=\tfrac{1}{2}\,S_{103}=\tfrac{1}{2}\times D3\times H$ (external flow section).

The flow section that can be attributed to the nozzle sector 100 is given by:

$$S_{100}=S_{100/1}+S_{100/2}+S_{100/3}=\tfrac{1}{2}\,S_{101}+S_{102}+\tfrac{1}{2}\,S_{103}$$

The above-described method consists in measuring the real distance H between the two walls 135-235 and 145-245 of the platforms 130 and 140, and in multiplying it by the distance D1 between the walls 111 and 222 of the adjacent vanes 110 and 220.

Alternatively, it is possible to make even finer use of the information available in the numerical models of the sectors to determine more exactly the flow area between adjacent vanes; for example, it can be observed that the portion of the plane P1 situated between the four above-mentioned walls is substantially a trapezoid (the walls of the vanes are parallel), and the area of this portion of the plane P1 can be determined accordingly.

In the end, the values of the various flow sections are obtained for the sector, and the sum constitutes the flow section that can be attributed to the sector, also referred to as the sector flow section.

To summarize, in order to determine the flow sections of a nozzle sector such as the sector 100 shown in the figures:

- the various internal and external flow sections that are to be determined are identified;
- the numerical models of the sector and of the adjacent sectors are taken in section on the plane parallel to the axes of the vanes and in which the distance between the vanes is the shortest;
- the area of the portion of the plane situated in the inter-vane passage in question is determined; and
- the flow section is equal to this area for internal sections, and to half of this area for external sections.

The method of the invention for selecting an arrangement of sectors for the nozzle of a turbomachine is described in detail below.

In the example under consideration, it is desired merely to optimize the selection of eleven sectors for occupying the positions I to XI of a nozzle, as shown in FIG. 4.

In a first step, the database of three-dimensional numerical models is created by digitizing a certain number of sectors.

In general, each of the nozzle sectors is digitized on its own (or at least without being specifically in its assembly relative position with respect to the reference vanes). Digitizing the sector serves to obtain a three-dimensional numerical model thereof. Since the nozzle sector is digitized on its own, it is easier to obtain a complete model for the sector, i.e. a model that includes all of its outside surfaces.

The numerical model obtained by digitizing includes digitizing the contact surfaces of the nozzle sector. These contact surfaces are the surfaces 131, 132, 141, 142 used for holding the sector relative to the adjacent sectors in the assembly relative position.

Numerical models are also obtained for the reference vanes. For each reference vane, the model contains the assembly surfaces of the sector of which the vane forms a part. By way of example, these models may be extracted from the three-dimensional computer model of the nozzle (or only of the sector).

The database containing the various sectors is thus created, including the reference vanes.

By way of example, it can thus be assumed that one hundred numerical models are produced for 100 nozzle sectors that are numbered 1 to 100. Each three-dimensional model includes a representation of its contact surfaces, thus enabling each sector to be reset relative to the adjacent sectors.

In a second step, a selection criterion is also set, for use in evaluating the quality of a given arrangement of sectors, and a preferred value is selected for this criterion. This criterion is a function of the flow sections of the sectors when they are in the assembly relative position in the arrangement. The following criterion is thus selected:

$$\text{criterion}=\Sigma_{arrangement}(S_i-S_0)^2$$

where $S_i$ is the flow section of sector i, and $S_0$ is the nominal flow section of a sector, and the sum applies to all of the sectors in the arrangement under consideration. (Other selections for the criterion are naturally possible).

The preferred value for this criterion is zero.

During the third step (C), consideration is given, amongst the sectors 1 to 100, to all of the arrangements of sectors that enable a portion of the nozzle to be built up. Each arrangement is presented as a sequence of individual references for the sectors in the arrangements, and ordered to match the positions I to XI, for example one such arrangement is the sequence (28-4-90-80-54-43-91-3-11-35-66), in which, for example, sector No. 28 occupies the position I and sector No. 66 occupies the position XI.

In each of the possible arrangements of the one hundred sectors in the eleven positions, the following procedure is applied:

- eleven sectors are virtually assembled in the assembly relative position. This operation is performed by causing the contact surfaces of each sector to correspond with the contact surfaces of the adjacent sectors. Naturally, in order to determine the external flow sections for the vanes situated in the end positions in an arrangement (if there are any), the reference vanes taken into consideration is the numerical model for a vane that has nominal dimensions and that is reset relative to the end sector; and
- with the numerical models of the sectors in this assembly relative position, the flow sections are determined for the various sectors, and on the basis thereof, the value for the above-mentioned criterion is determined for the arrangement under evaluation.

After calculating all of these values for the selection criterion, it is possible to move on to the last step. In this step, the arrangement is selected for which the value of the criterion is the closest to zero.

What is claimed is:

1. A method of arranging sectors for a turbomachine nozzle, comprising:

- A) creating a database of three-dimensional numerical models of the sectors by digitizing;
- B) setting a criterion for selecting an arrangement of sectors and setting a desired value for said criterion, the criterion being a function of shapes and relative positions of the sectors;
- C) selecting various arrangements of sectors for evaluation;
- D) for each of the various arrangements of sectors selected for evaluation, determining the relative positions of the sectors when assembled together by performing a virtual assembly, and determining a value of said criterion as a function of said positions;
- E) selecting an arrangement from the various arrangements for which the determined value of said criterion is closest to the desired value; and
- F) arranging the sectors in accordance with the selected arrangement.

2. The method of arranging sectors in accordance with claim 1, wherein, in step D), at least one evaluated arrangement is a combination of an arrangement as selected by the method plus another sector or another arrangement selected for evaluation.

3. The method of arranging sectors in accordance with claim 1, wherein, in step A), the database used for the method contains sectors coming from a single nozzle.

4. The method of arranging sectors in accordance with claim 1, wherein, in step A), the database used for the method contains sectors coming from at least two different nozzles.

5. The method of arranging sectors in accordance with claim 1, wherein the nozzle sectors include contact surfaces and are placed in position relative to adjacent nozzle sectors by putting said contact surfaces into abutment, wherein, in the database created in step A), the numerical models of the sectors of an arrangement include modeling contact surfaces involved in putting the sectors into their assembly relative positions, and in step D) the virtual assembly of the numerical models of the sectors in an arrangement selected for evaluation is performed by putting the contact surfaces of the adjacent sectors of said arrangement into correspondence.

6. The method of arranging sectors in accordance with claim 1, wherein step A) for creating a database of numerical models by digitizing is performed with contactless optical measurement means.

7. The method of arranging sectors in accordance with claim 1, wherein the selection criterion is a function of respective flow sections of the nozzle sectors.

8. The method of selecting an arrangement of sectors in accordance with claim 7, wherein, in order to determine a flow section of a sector located at one end of the arrangement, use is also made of a theoretical numerical model of a reference vane.

9. The method of arranging sectors in accordance with claim 7, wherein:

- a flow section between two adjacent vanes in a nozzle sector is a minimum area between the two adjacent vanes; and
- the flow section of the nozzle sector is based on a sum of:
- one-half of each flow section between an end vane of the sector and a reference vane set facing the end vane; and
- the flow section between each pair of adjacent vanes in the nozzle sector equal to an area of a section of an empty space between each pair of vanes in a plane parallel to axes of the vanes at a location where a distance between the vanes is shortest.

10. The method of arranging sectors in accordance with claim 7, wherein:

- a flow section between two adjacent vanes in a nozzle sector is a minimum area between the two adjacent vanes;
- the flow section between two adjacent vanes is determined based on a shortest distance therebetween; and
- the flow section of the nozzle sector is based on a sum of:
- one-half of each flow section between an end vane of the sector and a reference vane set facing the end vane; and
- the flow section between each pair of adjacent vanes in the nozzle sector.

11. A computer-implemented method of selecting an arrangement of sectors for a turbomachine nozzle, comprising:

A) creating a database of three-dimensional numerical models of the sectors by digitizing via a digitizing device;

B) setting a criterion for selecting an arrangement of sectors and storing in a memory of a computer a desired value for said criterion, the criterion being a function of shapes and relative positions of the sectors;

C) selecting various arrangements of sectors for evaluation;

D) for each of the various arrangements of sectors selected for evaluation, determining the relative positions of the sectors when assembled together by performing a virtual assembly on the computer, and determining with a processor of the computer a value of said criterion as a function of said positions;

E) selecting an arrangement from the various arrangements for which the determined value of said criterion is closest to the desired value; and F) saving in the memory of the computer the selected arrangement.

12. The method of selecting an arrangement of sectors in accordance with claim 11, wherein, in step D), at least one evaluated arrangement is a combination of an arrangement as selected by the method plus another sector or another arrangement selected for evaluation.

13. The method of selecting an arrangement of sectors in accordance with claim 11, wherein the nozzle sectors include contact surfaces and are placed in position relative to adjacent nozzle sectors by putting said contact surfaces into abutment, wherein, in the database created in step A), the numerical models of the sectors of an arrangement include modeling contact surfaces involved in putting the sectors into their assembly relative positions, and in step D) the virtual assembly of the numerical models of the sectors in an arrangement selected for evaluation is performed by putting the contact surfaces of the adjacent sectors of said arrangement into correspondence.

14. The method of selecting an arrangement of sectors in accordance with claim 11, wherein the selection criterion is a function of respective flow sections of the nozzle sectors.

15. The method of selecting an arrangement of sectors in accordance with claim 14, wherein:

a flow section between two adjacent vanes in a nozzle sector is a minimum area between the two adjacent vanes; and the flow section of the nozzle sector is based on a sum of:

one-half of each flow section between an end vane of the sector and a reference vane set facing the end vane; and the flow section between each pair of adjacent vanes in the nozzle sector equal to an area of a section of an empty space between the two vanes in a plane parallel to axes of the vanes at a location where a distance between the vanes is shortest.

* * * * *